Oct. 21, 1958 W. S. FERDON 2,857,525
RADIANT ENERGY PROTECTIVE CLOTHING, COVERING, SHELTER
AND MEANS FOR MAKING THE SAME
Filed July 18, 1955 2 Sheets-Sheet 1

INVENTOR
William S. Ferdon

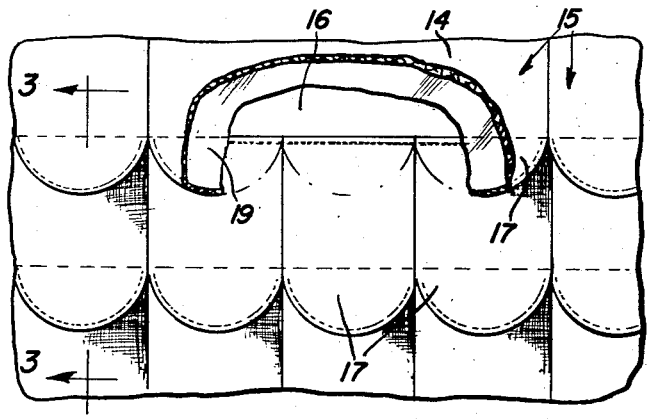
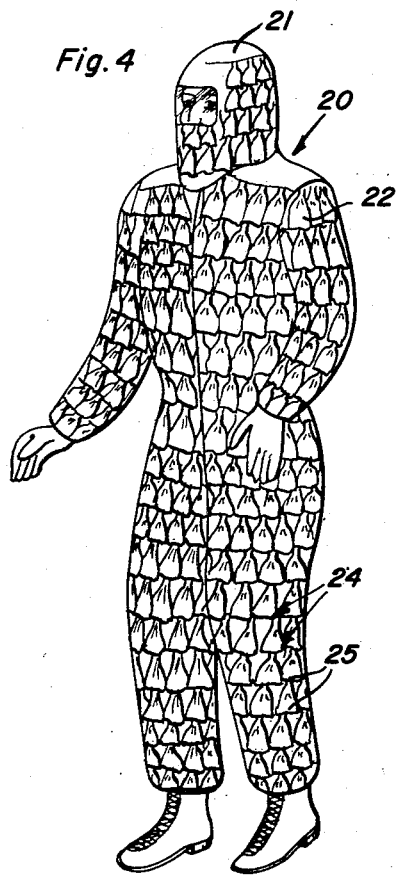
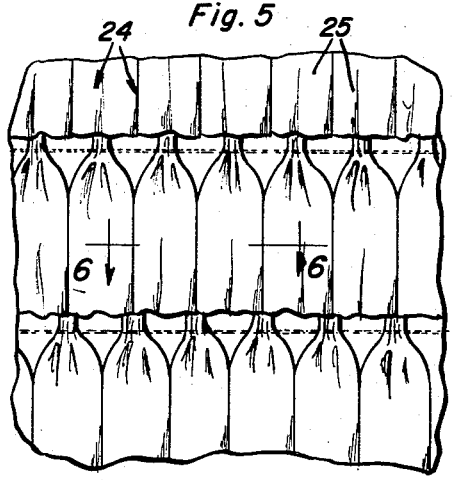
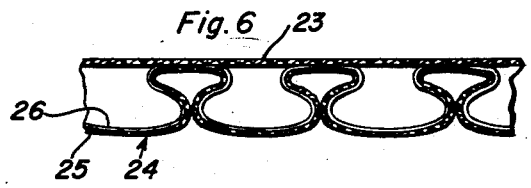

United States Patent Office 2,857,525
Patented Oct. 21, 1958

2,857,525

RADIANT ENERGY PROTECTIVE CLOTHING, COVERING, SHELTER AND MEANS FOR MAKING THE SAME

William S. Ferdon, Birmingham, Ala.

Application July 18, 1955, Serial No. 522,444

1 Claim. (Cl. 250—108)

This invention relates to a novel means of preventing nuclear fallout dust or the like from penetrating or centering into clothing, shelter or other covering means.

It has been found that radiant energy, fallout dust and the like have certain peculiarities. These are related to the angle of incidence at which the dust travels as well as the angle of attack on which the dust or the like settles on an object. As is well known, if a nuclear explosion occurs, depending on climatic conditions, humidity, winds and other variables, fallout dust will cause considerable damage on certain fixed types of surfaces. Recent experiments also indicate that such dust particles are more dangerous when well diffused than if more concentrated.

It is accordingly a principal object of the present invention to provide means whereby protective clothing, shelters or covers may be of automatically varying conditions to meet such variables as referred to above.

It is another object of the present invention to provide means for preventing the foregoing result by using the very atmospheric conditions prevailing to prevent the above effect from taking place and in effect to cause such nuclear fallout or the like to continue onward or to settle harmlessly down outside of the protective covering.

It is another object of the present invention to provide means of the above type wherein the amount of radiant energy will be materially reduced by people using the improved construction.

For other objects and a better understanding of the invention, reference may be had to the following detailed description taken in connection with the accompanying drawing, in which:

Fig. 2 is a fragmentary top plan view thereof on an enlarged scale and shown partly in section;

Fig. 4 is a perspective view of a modified form of the present invention;

Fig. 5 is a fragmentary side elevational view thereof on an enlarged scale; and

Fig. 6 is a transverse sectional view taken along the line 6—6 of Fig. 5.

Figure 1:
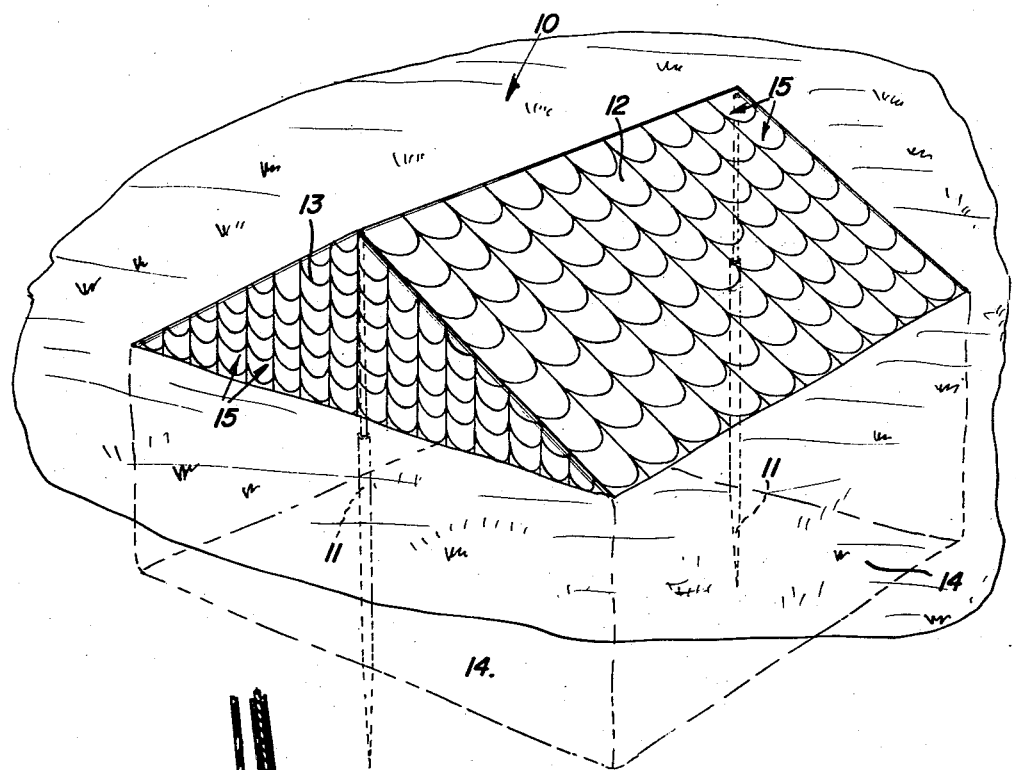
Figure 1 is a perspective view of a preferred embodiment of the present invention.

Referring now more in detail to the drawing and more particularly to Figs. 1 through 3, 10 indicates generally a tent constructed according to the present invention and including the usual tent posts 11, sloping top portions 12, end portions 13 and the side and end walls 14, substantially as illustrated.

Figure 3:
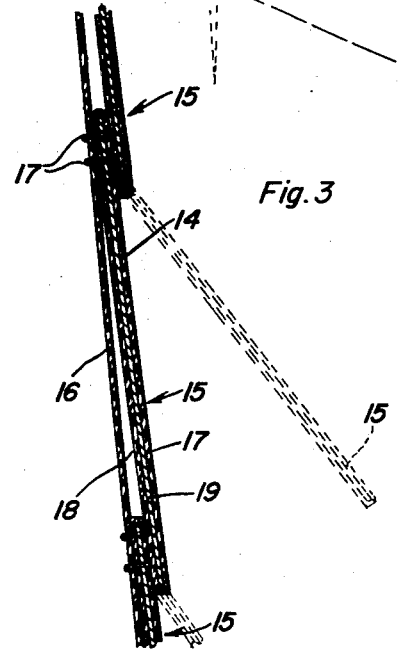
Fig. 3 is a fragmentary sectional view taken along the line 3—3 of Fig. 2.

As shown in Figs. 2 and 3, a plurality of shingle-like members or scales indicated generally at 15 are secured to the wall or top portion 16 of the tent by means of the stitching 17 at their upper ends. Each of the shingle-like members or scales 15 is composed of the outer fabric layer 17 and the inner fabric layer 18 integrally joined at their upper ends and between which is sandwiched the layer of lead foil 19 or other substance which is opaque to radio activity. It will be noted that the shingle-like members 15 may be rotated away from the inner fabric wall 15 about the stitching 17 for a purpose which will hereinafter become clear.

By means of the scales or shingle-like members 15 which may be rotated outwardly (Fig. 3) the angle of attack or angle of incidence of the radio active dust is changed as the scales are moved similar to the manner in which a fish having scales changes the angles of attack and angles of incidence of the water as it travels through it. The tent can be of any shape, although the triangular construction with folding poles and stakes is preferred. The shingle-like members or scales are formed of laminated leaded cloth, radiant flexible lead or glass fiber resistant materials. It will be seen that when the wind blows the fallout dust on one side of these scales the latter would batten down to the tent on that side, spreading out on the other portions and in effect stabilizing the amount of dust that could settle on the tent. If no wind were blowing, the occupant could safely tap the walls of the tent and the dust would settle away from the occupied area. It will also be seen that in the interior of a home, in the basement for example, occupants could have such a collapsed tent mounted above the room for instant use, air being piped in from some safe spot with a manual pump. Suction cups or other fastening means could be utilized for securing the lower edges of the tent to the floor, permitting the occupants to remain in perfect safety for hours with an occasional tapping of the walls of the tent preventing centering or penetration of the radiant energy from the fallout dust. It will also be apparent that the material which is opaque to the radio activity could be in the main structure of the tent and the flaps would then be of ordinary material. Or, both the walls and the flaps may be made of radio active resistant material or if such material were not available, they could both be constructed without it.

It will be readily apparent that the same construction can be applied to clothing, as shown in Figs. 4 through 6, there is indicated generally a suit 20 including a helmet 21 and the coveralls 22. In this case, the inner lining of the suit is the fabric 23 to which is secured by stitching the pleats indicated generally at 24, each of the pleats 24 comprising the outer fabric layer 25 and the inner layer 26 of sheet lead or other material which is opaque to radio active particles. Thus, when the wearer is moving through a contaminated area, the flaps or pleats 24 will blow freely and shake off any fallout dust or the like, changing materially the angle of attack and the angle of incidence of possible penetration. This is important inasmuch as both the Atomic Energy Commission and the Bureau of Standards have found that there is a relationship in penetration to the angle of incidence and the angle of attack. For example, a smooth surfaced house is attacked more easily than a shingled house.

Although in the drawings, there has been shown a tent and a suit of clothing, it will be readily apparent that the construction is readily applicable to other shelters, covers, or the like.

The tent form of Figs. 1 through 3 is particularly advantageous for military purposes for personnel within a fox hole which will first be dug and a tent placed over the same to completely insulate the occupant from the radio active fallout dust.

It should be apparent that when one evacuates a city during an atomic or nuclear attack, those persons going in a given direction could conceivably lie in the course of the atomic fallout. With the present invention in the form of a tent or complete cover for an automobile (and simply folded and carried in the back trunk) if such fall out become apparent and the driver was on the road, he could drive into an open field, cover his car and park there and avoid damage. If desired, the car could be provided with an air filter, permitting several hours of such parking without harm to the occupant. Thus, the invention in an emergency would save many lives and the health of many people.

While various changes may be made in the detail construction, it shall be understood that such changes shall be within the spirit and scope of the present invention as defined by the appended claim.

What I claim as new and desire to protect by Letters Patent of the United States is:

A flexible shingle-like laminated material, comprising, in combination, a first layer of flexible sheet material, a second layer of flexible sheet material, a third layer of light weight and substantially radioactive impervious metallic foil sandwiched between said first and second layers, fastening means securing one edge of each of said first, second, and third layers together, and all of said layers being substantially rotatable about said respective one edge relative to each other to accommodate various types of motions therebetween.

References Cited in the file of this patent

UNITED STATES PATENTS

| | | |
|---|---|---|
| 1,611,031 | Henderson | Dec. 14, 1926 |
| 2,718,598 | Graf | Sept. 20, 1955 |

FOREIGN PATENTS

| | | |
|---|---|---|
| 464,189 | Germany | Aug. 14, 1928 |